United States Patent Office 3,817,704
Patented June 18, 1974

3,817,704
SLUDGE- AND CORROSION-INHIBITING COMPOSITIONS
Donald D. Dearmont, Stow, Ohio, and Forrest D. Stockwell, Glendale Heights, Ill., assignors to Phillips Petroleum Company
No Drawing. Filed Apr. 15, 1971, Ser. No. 134,405
Int. Cl. C23f 15/00
U.S. Cl. 21—2.5 R
5 Claims

ABSTRACT OF THE DISCLOSURE

The formation of sludge is materially inhibited in systems wherein a metal surface is in contact with a dissimilar material such as rubber in the presence of a working fluid by the use of a synthetic rubber composition containing certain silaceous materials.

---

This invention relates to organic compositions and processes for the inhibition of sludge formation and corrosion in systems where metal surfaces are in contact with a dissimilar material such as rubber in the presence of a working fluid.

Rubber compositions are widely used in contact with metal surfaces in the presence of a working fluid such as seals, transfer lines, reservoir linings and the like. Although providing excellent service, the compounds are subject to solvation or extraction by the fluid environment thereby causing failure of the rubber composition or element, the formation of sludge in the system from material extracted from the rubber composition, or creation of a corrosion environment which can deleteriously affect the metal component. Generally, each of these problems will be present to some degree in systems wherein metal surfaces are in contact with a rubber composition in the presence of a working fluid. Solutions to this continuing problem can include modifying any or all of the systems, and usually are effected by treatment of the metal surfaces or addition of corrosion inhibitors to the fluid vehicle. Generally, rubber compositions exposed to such surface are formulated from synthetic materials which can be tailored to a particular use more readily than natural rubber materials. The most widely used materials in such service have been synthetic elastomers derived from emulsion polymerization processes. Such materials have been found to be essentially noncorrosive; however, they are subject to solvation or extraction leading to sludge formation and erosion of the rubber component. This solvation of the rubber compound is manifested by a change in hardness and swell values of the rubber composition with the accompanying formation of sludge. Thus, it is readily apparent that rubber compositions which are not only resistant to the induction of corrosion but are also resistant to sludge formation would be highly desirable.

Studies of the problem of formation of sludge and induction of corrosion resulted in the discovery that certain solution-polymerized synthetic elastomers were highly resistant to solvation and erosion in comparison to emulsion-polymerized elastomers under the same conditions. Unfortunately, the use of solution elastomers in place of emulsion elastomers resulted in the development of a corrosion environment which was detrimental to the metal surfaces in contact with the elastomeric material.

It has now been discovered that rubber compositions comprising a solution-polymerized synthetic elastomer materially inhibit corrosion and sludge formation in systems wherein a metal surface is in contact with a rubber element in the presence of a working fluid such as a hydraulic fluid by the expedient of incorporating into the elastomer formulation minor amounts of certain silaceous materials.

The synthetic elastomers which are suitable for use in the practice of the invention can be broadly defined as solution-polymerized elastomers obtained by the polymerization, in the presence of a suitable diluent which is a solvent for the polymer product and an alkali metal-based polymerization initiator including (1) an Alfin catalyst, (2) an organolithium compound or (3) an alkali metal, of conjugated dienes containing from 4 to 12, preferably 4 to 8, carbon atoms per molecule. Examples of monomers that can be used in the preparation of the polymers include 1,3-butadiene; isoprene; piperylene; 2,3-dimethyl-1,3-butadiene; 1,3-octadiene; 4,5-diethyl-1,3-octadiene; and the like. These conjugated dienes can be polymerized to form homopolymers or mixtures of the dienes can be polymerized to form copolymers. These conjugated dienes can also be polymerized with one or more copolymerizable monovinylidene - containing monomers, such as styrene, 2-methylstyrene, vinylnaphthalene, or the like. The solution polymers which are suitable in the practice of the invention can be prepared by known methods using any of the mentioned catalyst systems. Representative of such processes are those disclosed in U.S. Pats. 2,975,160 and 3,324,089, which disclose solution polymerization processes using organolithium catalysts; U.S. Pat. 3,285,901, which discloses solution polymerization systems using alkali metal catalyst systems; and U.S. Pat. 3,067,187, which discloses solution polymerization processes using Alfin catalysts. The solution polymers obtained from organolithium compound catalytic processes are preferred with 1,3-butadiene/styrene copolymers prepared according to the procedures of U.S. Pat. 3,324,089 being especially preferred.

The silaceous materials which are suitable in the practice of the invention as additives for solution-polymerized synthetic elastomers to provide the sludge and corrosion-inhibiting compositions of the invention are selected from the group consisting of precipitated metal silicates, wherein said metal is selected from the group consisting of Group IIa or Group IIIa elements, with precipitated calcium silicate being particularly preferred. The precipitated metal silicates which are useful in the practice of the invention have an average particle size not greater than 10 microns, preferably 0.01–0.1 micron, with such silicates having an average particle size in the range of 0.01–0.05 micron being particularly preferred. Such metal silicates will normally contain water of hydration in an amount in the range of about 5 to about 25 percent, based upon total weight of metal silicate and water with such silicates having a water of hydration range of about 10 to 20 percent being particularly preferred. Metal silicates which have been modified by the incorporation of small amounts, e.g., 2 to 9 percent by weight, of an alcohol such as ethylene glycol, propylene glycol, glycerol and diethylene glycol can also be used in the practice of the invention. Examples of representative metal silicates include precipitated hydrated calcium silicate, precipitated magnesium silicate and precipitated aluminum silicate. Mixtures of the silicates can be used.

The metal silicate additives of this invention will generally be used in amounts varying from about 1 to 5, preferably 2 to 5, and particularly 3, parts by weight of additives per 100 parts by weight of elastomer in the rubber compound recipe. The additives of the invention can be added to the rubber compound at any time prior to the vulcanization thereof and in any sequence for the other recipe ingredients provided that an essentially homogeneous mixture of recipe ingredients is obtained. It has been found convenient to simply add the metal silicate to the rubber as the other recipe ingredients, e.g., fillers, plasticizers, and the like, are being added to and mixed with the rubber in a roll mill or an internal mixer.

The metal silicate additives of this invention can be employed with the usual compound recipes, i.e., conventional fillers such as carbon blacks of various types, clays, and silicas, can be employed at conventional levels in said recipes. Conventional curing or vulcanization systems can be used, e.g., sulfur-based curing systems or peroxide-type curatives can be used. Plasticizers, antioxidants, pigments, stabilizers and the like which are conventionally employed in rubber compound recipes can also be used at conventional levels in the practice of this invention. Specific problems which might be occasioned through the use of the additives of this invention, if serious enough to be a drawback, such as cure retardation, can usually be overcome by recipe variations well known in the art, such as by employing an ultra-accelerator or the like.

The improved rubber compositions of this invention are particularly effective in the inhibition of corrosion and sludge formation in systems wherein the metal surface contacted by the rubber element is a carbon steel material. The compositions of the invention are especially effective in such systems wherein the carbon content of the metal is below 0.5 weight percent.

The practice of the invention can be illustrated by the following examples.

EXAMPLE I

Formulations employing solution-polymerized butadiene/styrene rubber were prepared for the purpose of testing the effect of added metal silicates on the corrosion of SAE 1020 steel according to the procedure described in Item 13 below. A compound employing Philprene [1] 1503 was used as one control and another compound employing a mixture of Philprene [1] 1503 and Philprene [1] 1605 was used as another control run. The compounding recipes and the results are shown below.

[1] Trademark.

| Compound | 1 | 2 | 11 | 12 |
|---|---|---|---|---|
| Recipe (parts by weight): | | | | |
| Solprene [1] 304 | 100 | 100 | 0 | 0 |
| Philprene [1] 1503 | 0 | 0 | 100 | 20 |
| Philprene [1] 1605 | 0 | 0 | 0 | 120 |
| Philblack [1] N550 | 40 | 55 | 40 | 0 |
| Silene EF | 3 | 3 | 3 | 3 |
| AgeRite Resin D | 2 | 2 | 2 | 2 |
| AgeRite White | 0.5 | 0.5 | 0.5 | 0.5 |
| Santocure MOR | 1 | 1 | 1 | 1 |
| DiCup 40C | 4.5 | 4.5 | 4.5 | 4.5 |
| Protox 166 | 0.3 | 0.3 | 0.3 | 0.3 |
| Spider Sulfur | 0.3 | 0.3 | 0.3 | 0.3 |
| Compounded Mooney data: | | | | |
| ML 1½′ at 212° F | 61 | 91 | 73 | 65 |
| ML 4′ at 212° F | 55 | 82 | 65 | 59 |
| Scorch at 280° F. (+5) | 5.7 | 4.6 | 6.7 | 6.5 |
| Minimum Mooney | 32 | 51 | 43.5 | 38.5 |

[1] Trademark.

TABLE I

| Compound | 1 | 2 | 11 | 12 |
|---|---|---|---|---|
| Original properties | | | | |
| 10 minutes cure at 340° F.: | | | | |
| 300% modulus, p.s.i. | 1,550 | | 1,370 | 1,250 |
| Tensile strength, p.s.i. | 1,940 | 2,240 | 2,750 | 2,600 |
| Elongation, percent | 350 | 260 | 500 | 550 |
| Shore A Hardness | 59 | 69 | 58 | 59 |
| Compression set, ASTM-B, percent (22 hours at 158° F.) | 6.9 | 4.8 | 13.7 | 14.9 |
| Sludge formation in brake fluid | None | None | Medium | Medium |
| Corrosion resistance in brake fluid (Rating 0–10, 0 best) | 1+ | 1+ | 2+ | 2+ |
| Brittle point, ASTM D746, ° F | −84 | −76 | −70 | −70 |
| Aged 70 hours at 260° F. in Dow H.D. brake fluid | | | | |
| Shore A hardness | 58 | 65 | 50 | 49 |
| Volume change, percent | +14.6 | +13.7 | +12.1 | +14 |
| Points hardness change | −1 | −5 | −8 | −10 |
| Aged 70 hours at 300° F. in Dow H.D. brake fluid | | | | |
| Shore A hardness | 53 | 63 | 49 | 47 |
| Volume change, percent | +19.0 | +19.7 | +17 | +18.1 |
| Points hardness change | −6 | −7 | −9 | −12 |
| Aged 70 hours at 260° F. in Wagner 21B brake fluid | | | | |
| Shore A hardness | 53 | 65 | 52 | 51 |
| Volume change, percent | +17.0 | +12.4 | +13.7 | +15.1 |
| Points hardness change | −6 | −5 | −6 | −8 |
| Aged 70 hours at 300° F. in Wagner 21B brake fluid | | | | |
| Shore A hardness | 52 | 62 | 49 | 45 |
| Volume change, percent | +20.0 | +20.0 | +18.3 | +19.2 |
| Points hardness change | −7 | −8 | −9 | −14 |

The above results demonstrate that the metal silicate additives of this invention provide corrosion protection with solution-polymerized rubbers. As indicated above, the compositions employing Philprene [1] 1503 and Philprene [1] 1605 were somewhat more corrosive than the rubber compositions prepared according to the invention. It is further shown that the additives of the invention cause no undesirable loss of the physical properties of the rubber compounds containing such additives.

EXAMPLE II

Formulations employing Solprene [2] 304 and Solprene [2] 301 were prepared for the purpose of testing the effect of added metal silicates on inhibiting the corrosion of SAE 1020 steel in the presence of different solution-polymerized rubber materials. The test procedure was the same as employed in Example I. In each instance, formulations containing no added silicates were used as control runs. The compounding recipes and results are reported below.

| Compound | 21 | 22 | 31 | 32 |
|---|---|---|---|---|
| Recipe (parts by weight): | | | | |
| Solprene [1] 304 | 100 | 100 | | |
| Solprene [1] 301 | | | 100 | 100 |
| Philblack [1] N550 | 55 | 55 | 55 | 55 |
| Silene EF | 0 | 3 | 0 | 3 |
| AgeRite Resin D | 2 | 2 | 2 | 2 |
| AgeRite White | 0.5 | 0.5 | 0.5 | 0.5 |
| Santocure MOR | 1 | 1 | 1 | 1 |
| DiCup 40C | 4.5 | 4.5 | 4.5 | 4.5 |
| Spider Sulfur | 0.3 | 0.3 | 0.3 | 0.3 |
| Protox 166 | 0.5 | 0.5 | 0.5 | 0.5 |

[1] Trademark.

Corrosion Rating (0–4; 0=none; 1=very slight; 2=slight; 3=medium; 4=heavy)

21 ---- 3
22 ---- 0
31 ---- 3
32 ---- 2

[1] Trademark.
[2] Trademark.

The above results demonstrate that the metal silicate additives of the invention are effective in providing corrosion protection with solution-polymerized rubbers.

Listed below are the identification of various compounding ingredients and test methods employed in the foregoing example:

1. Philprene[1] 1503: Cold nonpigmented emulsion-polymerized SBR having 23.5% bound styrene and having a nominal Mooney Viscosity (ML-4 @ 212° F.) of 52;
2. Philprene[1] 1605: Cold black masterbatch emulsion-polymerized SBR having 23.5% bound styrene and having a nominal Mooney Viscosity (ML-4 @ 212° F.) of 62 with 50 phr fast extrusion furnace carbon black;
3. Solprene[1] 301: Solution-polymerized butadiene/styrene (75/25) random copolymer having a Mooney Viscosity (ML-4 @ 212° F.) of 70-85;
4. Solprene[1] 304: Solution-polymerized butadiene/styrene (90/10) random copolymer having a Mooney Viscosity (ML-4 @ 212° F.) of 29-37;
5. Philblack[1] N550: Fast extrusion-type furnace carbon black;
6. Silene EF: Precipitated hydrated calcium silicate having water of hydration content of 10-20% and ultimate particle size of 0.03 micron;
7. AgeRite Resin D: Polymerized trimethylhydroquinoline, an antioxidant;
8. AgeRite White: Symmetrical di-$\beta$-naphthyl-$p$-phenylenediamine, an antioxidant;
9. Santocure MOR: 2-(morpholinothio)benzothiazole, an accelerator;
10. DiCup 40C: Commercial product containing 40% by weight dicumyl peroxide and 60% by weight precipitated calcium carbonate, a vulcanizer;
11. Protox 166: Zinc oxide surface treated with propionic acid, an activator;
12. Spider brand sulfur: Elemental sulfur treated with magnesium carbonate, a vulcanizer;
13. Corrosion Test Method: A 10 g. sample of cured rubber compound was broken to crumb form on a roll mill and placed in a mixture of 95 ml. of isopropyl alcohol and 5 ml. of distilled water. A piece of SAE 1020 steel (1 inch x ½ inch x 50 mils) which had been ground smooth and then machine polished on the surfaces was then inserted into the mixture in a container. The container was closed and maintained at room temperature (about 77° F.) for one week. The surfaces of the steel plate were then examined visually without magnification and a corrosion (tarnish) rating assigned by the observer.

While certain embodiments of the invention have been described for illustrative purposes, the invention is not limited thereto. Various other modifications or embodiments of the invention will be apparent to those skilled in the art in view of this disclosure. Such modifications or embodiments are within the spiirt and scope of the disclosure.

[1] Trademark.

We claim:
1. A method for inhibiting induction of corrosion and inhibition of sludge formation in hydraulic systems wherein a steel surface is in contact with a rubber composition in the presence of a hydraulic brake fluid comprising contacting said metal with a rubber composition comprising a homogeneous mixture of a solution-polymerized synthetic elastomer and a precipitated metal silicate, wherein said metal is selected from the group consisting of Group IIa or Group IIIa elements, wherein said elastomer is obtained by the polymerization, in the present of a solvent for said elastomer and an alkali metal-based polymerization initiator selected from the class consisting of alfin catalysts, organolithium compound or alkali metals, of at least one conjugated diene containing from 4 to 12 carbon atoms per molecule or by the copolymerization in the presence of such polymerization initiator of at least one conjugated diene containing from 4 to 12 carbon atoms per molecule and at least one monovinylidene-containing monomer copolymerizable with said conjugated dienes, said monovinylidene-containing monomer being selected from the group consisting of styrene, 2-methylstyrene or vinylnaphthalene.

2. A method according to claim 1 wherein the amount of said metal silicate is in the range of 1 to 5 parts by weight per 100 parts by weight of elastomer.

3. A method according to claim 1 wherein said elastomer is a copolymer of butadiene and styrene.

4. A method according to claim 1 wherein said metal silicate is calcium silicate.

5. A method according to claim 4 wherein said calcium silicate is present in an amount of 3 weight percent.

References Cited

UNITED STATES PATENTS

| | | | |
|---|---|---|---|
| 3,228,998 | 1/1966 | Fierce et al. | 260—928 |
| 3,287,275 | 11/1966 | Seil | 252—75 |
| 3,426,006 | 2/1969 | Nutzel et al. | 260—83.5 |
| 3,464,961 | 9/1969 | Foster | 260—83.7 |
| 3,592,793 | 7/1971 | Latos | 260—41.5 |
| 3,177,183 | 4/1965 | Naylor et al. | 260—82.1 |
| 3,285,901 | 11/1960 | Forman | 260—94.2 |
| 3,432,460 | 3/1969 | Spacht | 260—45.9 |
| 2,975,160 | 3/1961 | Zelinski | 260—83.7 |
| 3,359,231 | 12/1967 | Kent | 260—41.5 |
| 3,223,694 | 12/1965 | Farrar, Jr. | 260—94.3 |
| 3,325,429 | 6/1967 | Harris | 260—23.7 |
| 3,419,639 | 12/1968 | Gentile | 260—889 |

OTHER REFERENCES

"Compounding Ingredients for Rubber," Third Edition, 1961, p. 335.

DONALD E. CZAJA, Primary Examiner

R. A. WHITE, Assistant Examiner

U.S. Cl. X.R.

252—74, 75, 389 R; 260—41.5 A